United States Patent
Noh et al.

(10) Patent No.: US 8,352,825 B2
(45) Date of Patent: Jan. 8, 2013

(54) METHOD FOR PACKET RETRANSMISSION EMPLOYING FEEDBACK INFORMATION

(75) Inventors: Min Seok Noh, Gyeonggi-do (KR); Yeong Hyeon Kwon, Gyeonggi-do (KR); Jin Sam Kwak, Gyeonggi-do (KR); Dong Cheol Kim, Gyeonggi-do (KR); Sung Ho Moon, Gyeonggi-do (KR); Seung Hee Han, Gyeonggi-do (KR); Hyun Woo Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1017 days.

(21) Appl. No.: 12/348,447

(22) Filed: Jan. 5, 2009

(65) Prior Publication Data

US 2009/0249158 A1    Oct. 1, 2009

Related U.S. Application Data

(60) Provisional application No. 61/018,673, filed on Jan. 3, 2008.

(30) Foreign Application Priority Data

Mar. 11, 2008   (KR) .................. 10-2008-0022478

(51) Int. Cl.
   *H04L 1/14* (2006.01)
(52) U.S. Cl. .................. 714/750; 375/240.07
(58) Field of Classification Search .......... None
   See application file for complete search history.

(56) References Cited

U.S. PATENT DOCUMENTS

| | | | | |
|---|---|---|---|---|
| 5,828,677 | A * | 10/1998 | Sayeed et al. ............. | 714/774 |
| 2002/0037000 | A1 | 3/2002 | Park et al. | |
| 2002/0168945 | A1 | 11/2002 | Hwang et al. | |
| 2003/0039227 | A1* | 2/2003 | Kwak ............. | 370/330 |
| 2003/0174669 | A1* | 9/2003 | Roh et al. ............. | 370/328 |
| 2004/0110473 | A1* | 6/2004 | Rudolf et al. ............. | 455/69 |
| 2004/0153909 | A1* | 8/2004 | Lim et al. ............. | 714/714 |
| 2004/0203986 | A1* | 10/2004 | Gagnon ............. | 455/522 |
| 2005/0047387 | A1* | 3/2005 | Frederiksen et al. ......... | 370/349 |
| 2006/0209813 | A1* | 9/2006 | Higuchi et al. ............. | 370/366 |
| 2007/0150787 | A1* | 6/2007 | Kim et al. ............. | 714/748 |
| 2008/0101312 | A1* | 5/2008 | Suzuki et al. ............. | 370/342 |
| 2008/0310338 | A1* | 12/2008 | Charpenter et al. ......... | 370/315 |
| 2009/0325502 | A1* | 12/2009 | Aiba et al. ............. | 455/67.11 |
| 2010/0135273 | A1* | 6/2010 | Kim ............. | 370/344 |

FOREIGN PATENT DOCUMENTS

| | | |
|---|---|---|
| CN | 1411182 | 4/2003 |
| CN | 101047481 | 10/2007 |
| KR | 1020040050756 | 6/2004 |
| KR | 1020040063324 | 7/2004 |

* cited by examiner

*Primary Examiner* — Gabriel Chu

(74) *Attorney, Agent, or Firm* — Lee, Hong, Degerman, Kang & Waimey

(57) ABSTRACT

A method for packet retransmission employing feedback information is disclosed. The method for packet retransmission employing feedback information comprises receiving reception acknowledgement information from a receiver after a transmitter transmits packets, the reception acknowledgement information representing channel status information and decoding success/failure of the packets; and changing a retransmission mode in accordance with the channel status information if the reception acknowledgement information represents decoding failure, and transmitting retransmission packets of the packets in accordance with the changed retransmission mode. Thus, it is possible to improve decoding probability of the receiver and increase efficiency of retransmission.

17 Claims, 9 Drawing Sheets

FIG. 7

| Val A | Val B | Val C | Val D |

FIG. 8

| Val A | dVal B | dVal C | dVal D |

FIG. 9

| Val Average | dVal A | dVal B | dVal C | dVal D |

Codeword
Bit/symbol order

METHOD FOR PACKET RETRANSMISSION EMPLOYING FEEDBACK INFORMATION

CROSS-REFERENCE TO RELATED APPLICATIONS

This application claims the benefit of earlier filing date and right of priority to U.S. Provisional Application No. 61/018,673, filed on Jan. 3, 2008. This application claims the benefit of earlier filing date and right of priority to Korean Patent Application No. 10-2008-0022478, filed on Mar. 11, 2008, which is hereby incorporated by reference as if fully set forth herein.

BACKGROUND OF THE INVENTION

1. Field of the Invention

The present invention relates to a method for packet retransmission, and more particularly, to a method for packet retransmission employing feedback information, in which a transmitter changes a retransmission mode and retransmits packets in accordance with information fed back from a receiver to enhance decoding probability of received packets.

2. Background Art

A communication system for next generation is designed to use a broadband frequency bandwidth and increase a data rate between a transmitter and a receiver. For configuration of such a communication system, an OFDM based modulation mode is mainly adopted. Examples of the wireless communication standard which uses the OFDM based modulation mode include 3GPP LTE(+), 3GPP2 UMB(+), IEEE 802.16 (d,e,m), IEEE 802.11, IEEE 802.20, IEEE 802.22, and HiperLAN. Examples of user classification modes in the communication system include FDMA mode in which users are classified based on a frequency axis and a TDMA mode in which users are classified based on a time axis. In the communication standard configured at the low cast, such as wireless LAN and HyperLAN, CSMA corresponding to the TDMA mode is mainly used. On the other hand, in the system such as 3GPP LTE, 3GPP2 UMB, and IEEE 802.16, which supports commercial voice communication, traffics of respective user equipments are classified from one another in accordance with an FDMA mode to maximize frequency efficiency. Accordingly, the above systems allow data to be transmitted under the control of a base station, and information for the control is transferred to a user equipment through scheduling information.

In a communication procedure between a user equipment and a base station, scheduling for maximizing frequency efficiency and obtaining multi-user diversity is mainly used. In other words, frequency resources are allocated in such a manner that a specific user equipment obtains maximum throughput using minimum frequency resources. The scheduling result according to the above allocation is set to be decoded by the user equipment without error and then transferred to the base station.

However, if channel status of the user equipment is not good, packet transmission between the base station and the user equipment does not end only one time but is accompanied with retransmission. Time-diversity and transmission energy boosting effects can simultaneously be obtained by packet retransmission. Although packet retransmission reduces maximum throughput, it is suitable to configure a reliable channel. A hybrid automatic repeat request (HARQ) mode is mainly used for initial transmission/retransmission of packets. Packets transmitted and received between the user equipment and the base station are encoded through a channel code. Various HARQ modes are generated in accordance with a method of converting packets in various formats. The simplest retransmission mode is that all codewords are used for every packet transmission. A receiver generally performs decoding using chase combining. As another method, there is provided an incremental redundancy (IR) method of transmitting codewords by splitting them. If new code bit information is received as retransmitted packets, it means that additional information is received. If the existing bits are received as retransmitted packets, bit combining is performed.

FIG. 1 illustrates that configuration of transmission packets may be varied whenever the packets are transmitted through HARQ.

If chase combining is used, retransmitted packets are equally configured. However, if IR is used, configuration of packets may be varied whenever the packets are retransmitted.

FIG. 2 illustrates a decoding procedure in a receiver.

It is assumed that IR is used. In this case, if the receiver receives retransmission packets, the receiver sets a part of the packets which are not received in each codeword to reliability 0 and performs decoding, i.e., soft decision decoding. Alternatively, the receiver assumes the part of the packets which are not received as erasure and then performs decoding, i.e., hard decision decoding.

Also, in case of codeword bits received in a multi-mode, the received bits are used by combination. In this case, the bits may be combined with one another in accordance with soft decision or hard decision. When the bits are combined with one another in accordance with soft decision, it is assumed that channel correction has been performed. Then, the receiver combines the received signals with one another and averages them through analog type or multi-bit precision. In this case, weighted combining can be performed in accordance with accuracy of the received bits. On the other hand, if only bits of 0 and 1 are required like hard decision decoding, 0 and 1 are selected based on majority when the respective bits are combined with one another.

The following Equation 1 represents soft combination when soft decision is performed, and the following Equation 2 represents majority selection when hard decision is performed. The actual configuration of each of Equations 1 and 2 may be varied depending on a decoding method.

$$R(k) = \sum_{i=1}^{N_R} w(k,i) r(k,i) \quad \text{[Equation 1]}$$

$$R(k) = \begin{cases} 1, & \sum_{i=1}^{N_R} w(k,i) r(k,i) > \frac{N_R}{2} \\ 0, & \text{Otherwise} \end{cases} \quad \text{[Equation 2]}$$

In this case, R(k) means soft/hard decision information of the received bits, r(k,i) means soft/hard decision value in the $i^{th}$ HARQ packet reception, and w(k,i) means a weight value to be applied to a corresponding bit in each transmission packet when combining is performed.

The aforementioned transmission/decoding method is suitable for a general blind channel. Also, the channel can have optimal throughput in a state that all bits have the same uncertainty as one another, like AWGN. Actually, most of wireless channels have frequency selective feature. For this reason, a problem occurs in that there is no ideal aspect in view of conventional IR or chase combining. In order to solve this problem, if blindness of channel is maintained, interleaver can be changed or subpackets of IR can be selected supposing mutual independent subcarrier features.

However, in order to obtain diversity of actual channel, additional channel information bits are provided to obtain better throughput.

If resources are allocated to a whole system bandwidth for packet transmission in a state that the transmitter does not know channel information, i.e., in case of a resource mode beyond a coherence bandwidth with a localized allocation mode, the transmitter needs to improve its transmission method to allow the receiver to use channel bandwidth more effectively. In this case, the number of times for packet retransmission is reduced, and packet transmission latency can be reduced.

However, in a state that the transmitter does not know channel information, there is limitation in obtaining diversity of actual channel.

SUMMARY OF THE INVENTION

Accordingly, the present invention is directed to a method for packet retransmission employing feedback information, which substantially obviates one or more problems due to limitations and disadvantages of the related art.

An object of the present invention is to provide a method for packet retransmission employing feedback information, which can improve decoding probability of a receiver by retransmitting packets using information fed back from the receiver.

To achieve the object and other advantages and in accordance with the purpose of the invention, as embodied and broadly described herein, a method for packet retransmission employing feedback information according to one embodiment of the present invention comprises receiving reception acknowledgement information from a receiver after a transmitter transmits packets, the reception acknowledgement information representing channel status information and decoding success/failure of the packets; and changing a retransmission mode in accordance with the channel status information if the reception acknowledgement information represents decoding failure, and transmitting retransmission packets of the packets in accordance with the changed retransmission mode.

Preferably, the channel status information includes CQI values of subbands divided in a unit of subcarrier.

Preferably, the channel status information includes maximum CQI value and minimum CQI value of subbands divided in a unit of subcarrier and reliability order of the subbands.

Preferably, the channel status information includes CQI average value of subbands divided in a unit of subcarrier and reliability order of the subbands.

Preferably, the channel status information includes CQI average value of channel, which is measured by the receiver.

Preferably, the channel status information includes information of a band other than a resource region where the receiver receives the packets.

Preferably, the step of transmitting retransmission packets includes changing a subcarrier mapping mode in accordance with the channels status information; and transmitting retransmission packets of the packets by applying the changed subcarrier mapping mode.

Preferably, the step of transmitting retransmission packets includes compensating a degraded channel by applying a power boosting scheme in accordance with the channels status information; and transmitting retransmission packets of the packets by using the compensated channel.

Preferably, the step of transmitting retransmission packets includes coordinating a redundancy rate of specific parts of incremental redundancy packets for retransmission in accordance with the channels status information; and retransmitting the incremental redundancy packets.

Preferably, the step of transmitting retransmission packets includes changing MIMO operation mode in accordance with the channels status information; and transmitting retransmission packets of the packets by applying the changed MIMO operation mode.

In another aspect of the present invention, a method for packet retransmission employing feedback information according to another embodiment of the present invention comprises receiving reception acknowledgement information from a receiver after a transmitter transmits packets, the reception acknowledgement information representing reliability information of the packets and decoding success/failure of the packets; and changing a retransmission mode in accordance with the reliability information if the reception acknowledgement information represents decoding failure, and transmitting retransmission packets of the packets in accordance with the changed retransmission mode.

Preferably, the reliability information includes reliability of blocks defined by one or more OFDM symbol sections of a codeword bit unit or subcarrier symbol unit in the packets.

Preferably, the reliability information includes maximum and minimum reliability values of blocks defined by one or more OFDM symbol sections of a codeword bit unit or subcarrier symbol unit in the packets, and reliability order of the blocks.

Preferably, the reliability information includes an average reliability value of blocks defined by one or more OFDM symbol sections of a codeword bit unit or subcarrier symbol unit in the packets, and reliability order of the blocks.

Preferably, the reliability information includes an average reliability value of all symbols received in the receiver.

Preferably, the step of transmitting retransmission packets includes changing a subcarrier mapping mode in accordance with the reliability information; and transmitting retransmission packets of the packets by applying the changed subcarrier mapping mode.

Preferably, the step of transmitting retransmission packets includes compensating a degraded channel by applying a power boosting scheme in accordance with the reliability information; and transmitting retransmission packets of the packets by using the compensated channel.

Preferably, the step of transmitting retransmission packets includes coordinating a redundancy rate of specific parts of incremental redundancy packets for retransmission in accordance with the reliability information; and retransmitting the incremental redundancy packets.

Preferably, the step of transmitting retransmission packets includes changing MIMO operation mode in accordance with the reliability information; and transmitting retransmission packets of the packets by applying the changed MIMO operation mode.

According to the embodiments of the present invention, a transmitter changes a retransmission mode and retransmits packets in accordance with information fed back from a receiver. Thus, it is possible to improve decoding probability of the receiver and increase efficiency of retransmission.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 to FIG. 9 are diagrams illustrating examples of configuring channel status information or reliability information in FIG. 4;

DETAILED DESCRIPTION OF THE INVENTION

Hereinafter, the preferred embodiments of the present invention will be described with reference to the accompanying drawings. However, it is to be understood that various modifications can be made in the following embodiments of the present invention, and the scope of the present invention is not limited to the following embodiments.

When a wireless system determines a modulation order or coding rate of initial packets, channel quality information or channel status information in the position where packets should be transmitted is required. The channel quality information or channel status information is transferred through feedback.

There are several methods of transferring channel information. Of them, the method generally used is that a single CQI value calculated for the whole system bandwidth in accordance with a given measurement rule is transferred or a transmitter notifies a transmitter that a part where channel status of the receiver is the best within a given band for packet transmission. This method is generally referred to as a best M method. Information transferred through this method indicates that a user equipment can show optimal receiving performance within a specific bandwidth. Since the transmitter can transmit packets using the specific bandwidth if possible and allocate another bandwidth to another receiver, multi-user diversity can be obtained over the whole system.

However, if packets of initial transmission have been failed, the transmitter should retransmit the packets. At this time, if the transmitter does not exactly know status of sub-carriers through which the packets are transmitted, time diversity expected during retransmission cannot be obtained optimally. Particularly, when the transmitter or the receiver moves at high speed, channel status is fully varied due to the time difference between the previous packet transmission time and packet retransmission time. In this case, since channel status cannot be estimated, time diversity is obtained passively. Namely, time diversity effect is obtained only if channel change is suitable for a scheme used in the transmitter. Channel may be changed in such a manner that minimum diversity gain is obtained at a specific retransmission time. Accordingly, in order to solve this problem, the transmitter should know the status of the receiver more specifically, whereby the maximum time diversity gain can be obtained.

Figure 1:
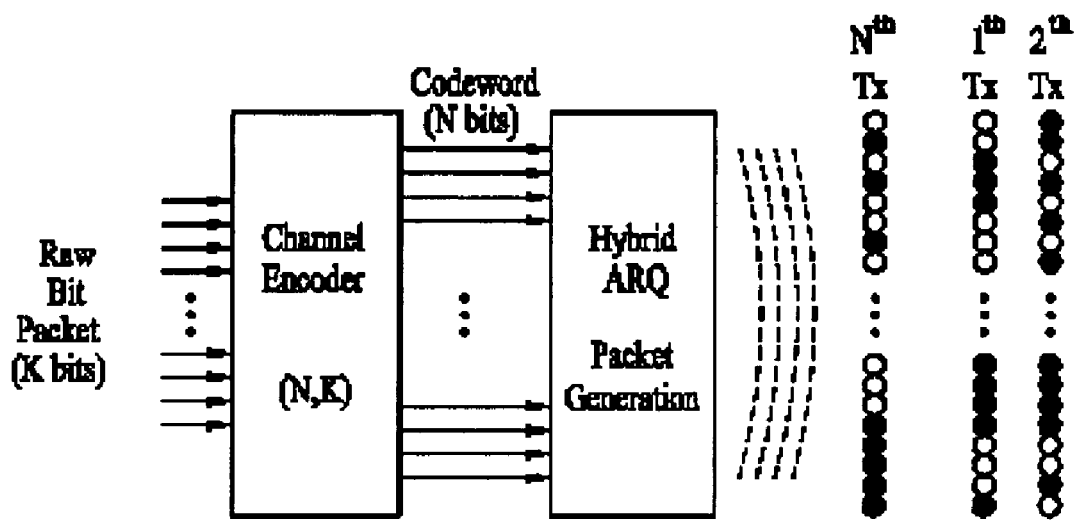
FIG. 1 is a diagram illustrating an encoding procedure of a transmitter and a configuration of retransmission packets according to HARQ mode.
Figure 2:
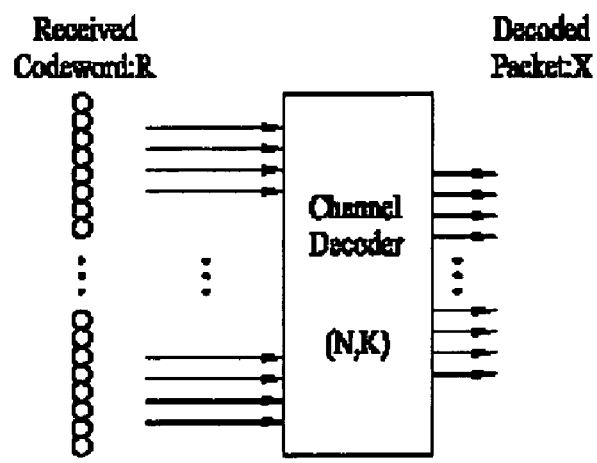
FIG. 2 is a diagram illustrating a decoding procedure of a receiver.
Figure 3:
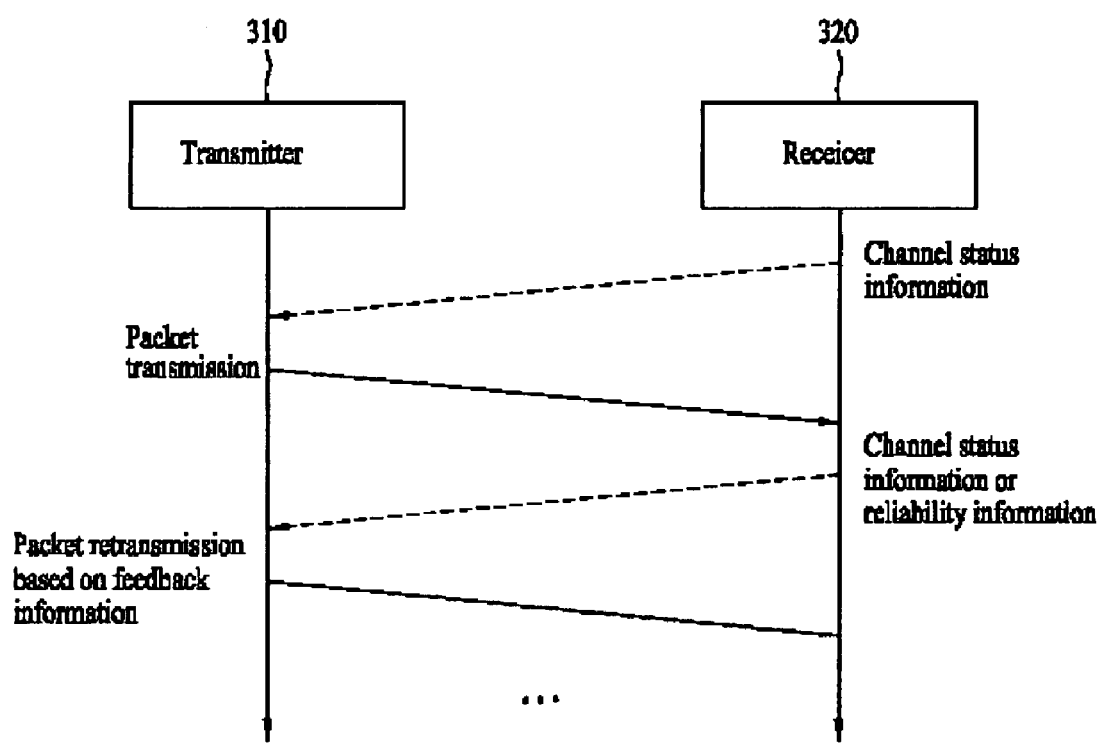
FIG. 3 is a brief signal flow chart illustrating a method for packet retransmission employing feedback information according to the present invention.

FIG. 3 is a brief signal flow chart illustrating a method for packet retransmission employing feedback information according to the present invention.

If a transmitter 310 receives channel information from a receiver 320 before transmitting initial packets, the transmitter 310 transmits the packets in accordance with channel information. If there is no channel information in the transmitter 310, the transmitter determines a modulation coding scheme (MCS) using a basic algorithm. After the packets are arrived in the receiver 320, the receiver 320 performs channel estimation and performs packet decoding based on channel estimation if the packets should be decoded in a coherent mode. In case of a non-coherent detection mode such as a differential modulation scheme, although channel information is not estimated, reliability of each codeword bit is affected by the channel status. If decoding is successfully performed, a packet transmission procedure is completed. However, if not so, the receiver should notify the transmitter 310 that packet decoding has been failed. To this end, a signal such as ACK/NACK can be used. In this case, for signal transfer, a coherent response for direct signal transfer or on/off function of signal can be used. However, packet configuration that can enhance decoding probability during next retransmission can be determined by the method of simply detecting whether decoding has been failed.

Accordingly, the transmitter 310 retransmits packets using feedback information transferred from the receiver 320.

Information that can be transferred from the receiver 320 to the transmitter 310 can include ACK/NACK representing whether packet decoding has succeeded or failed, reliability information of packets, and channel status information. In this case, reliability information of packets can include reliability per codeword, reliability per received symbol, reliability per subcarrier segment of received signal, reliability per bit group, and reliability per symbol group. Also, the channel status information can represent channel status or reliability of band where packets are received, channel status or reliability of subband that can be used by a user equipment, and channel status or reliability of the whole system band by dividing them into one or more subbands.

The transmitter 310 determines option for retransmission in accordance with its basic algorithm or information of the receiver 320. If the transmitter 310 does not use feedback information, it generates packets by assuming randomness. If the transmitter 310 uses feedback information, the transmitter can establish reliability by adding error probability to the feedback information. As a result, the transmitter 310 can select increment redundancy version of HARQ, the position of resources to which packets will be retransmitted, or sub-carrier mapping mode, thereby obtaining optimal decoding probability.

Figure 4:
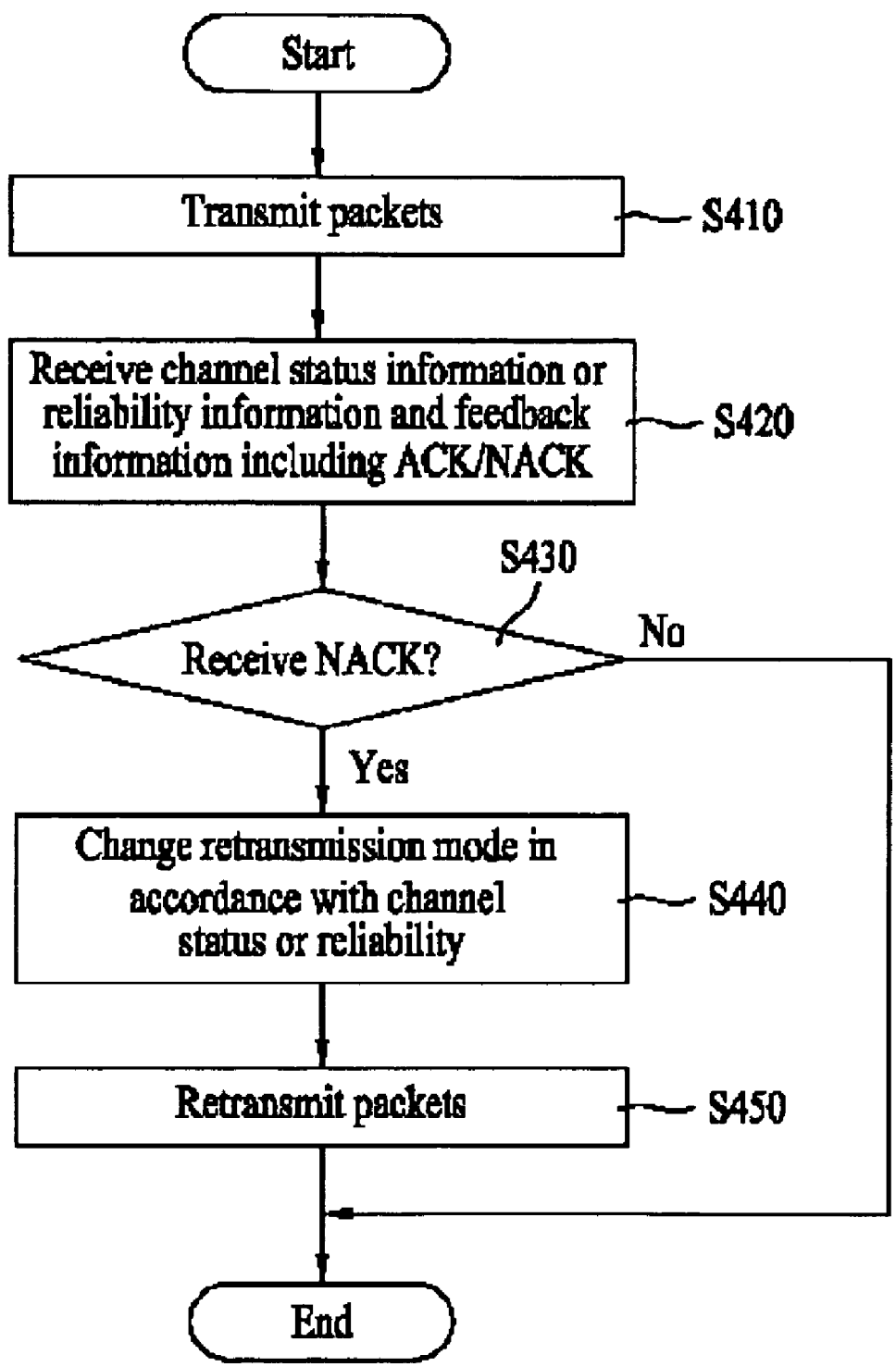
FIG. 4 is a flow chart illustrating a method for packet retransmission employing feedback information according to the present invention.

FIG. 4 is a flow chart illustrating a method for packet retransmission employing feedback information according to the present invention.

First of all, the transmitter transmits packets to the receiver (S410). The receiver determines decoding success/failure of packets to generate reception acknowledgement information, i.e., ACK or NACK. The receiver determines channel status information or reliability information and feeds the channel status information or the reliability information back to the transmitter together with the reception acknowledgement information.

Next, the transmitter receives the channel status information or the reliability information and the reception acknowledgement information from the receiver (S420). At this time, if NACK is not received or if ACK is received in the transmitter, the transmitter performs a conventional packet transmission procedure by skipping the following steps.

Meanwhile, if NACK is received or if ACK is not received in the transmitter, i.e., if the reception acknowledgement information represents decoding failure, the transmitter changes a retransmission mode in accordance with the channel status information (S440).

Finally, the transmitter transmits retransmission packets for the initially transmitted packets to the receiver in accordance with the changed retransmission mode (S450).

If the receiver transmits ACK/NACK only in the same manner as the related art, the receiver can decode the packets using one or more decoding methods based on resource allocation region and packet configuration information and transfer decoding success/failure to the transmitter, wherein the resource allocation region and the packet configuration information are notified from the transmitter when the transmitter transmits the corresponding packets.

According to the example of feedback applied to the present invention, the receiver can decode packets and transmit channel status information together with ACK/NACK based on the decoded result.

The channel status information could be channel information in a resource region of the receiver, where the packets are received.

Figure 5:
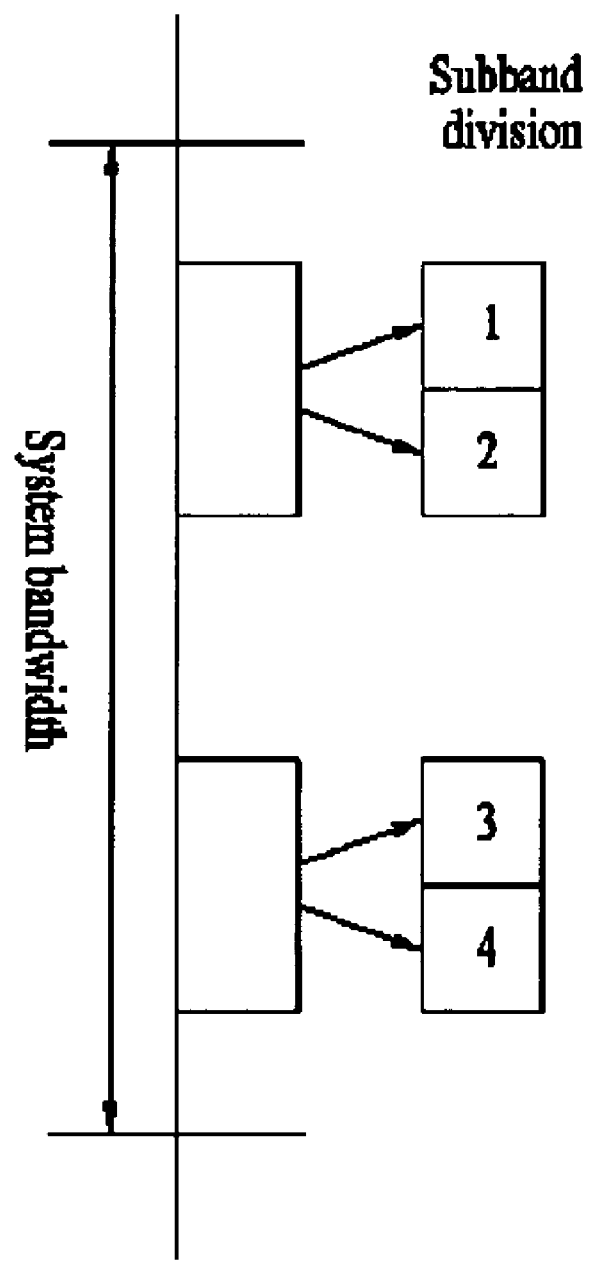
FIG. 5 is a diagram illustrating an example of a method for dividing blocks for feedback information in case of a localized distributed resource allocation mode in FIG. 4.
Figure 6:
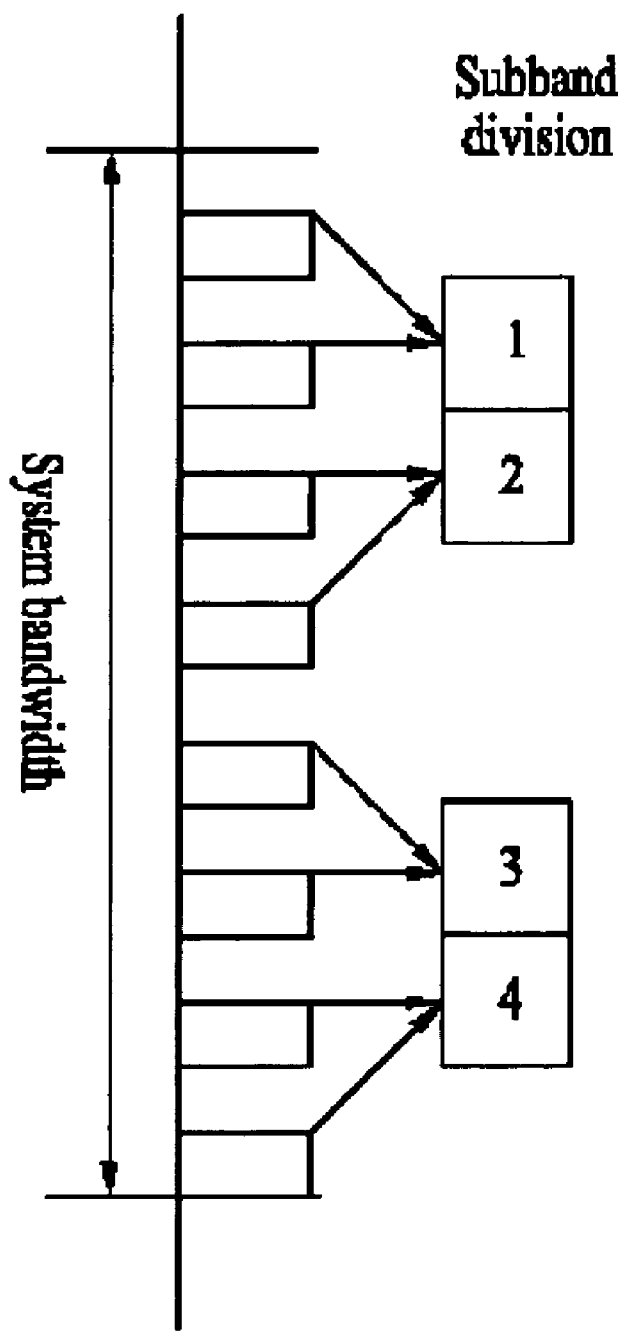
FIG. 6 is a diagram illustrating an example of a method for dividing blocks for feedback information in case of a distributed resource allocation mode in FIG. 4.

As illustrated in FIG. 5 and FIG. 6, examples of the resource mode used to transmit packets from the transmitter include a localized allocation mode, a localized-distributed allocation mode, and a distributed allocation mode.

In case of the localized allocation mode, the position of resources is varied whenever the transmitter transmits packets. If additional information is fed back to the corresponding resource block, the transmitter can use the information as a key that can identify whether specific symbols can be received with what reliability. The localized allocation mode corresponds to a case where there exists one allocation block. In FIG. 5, the receiver divides one localized resource block into two subbands and determines channel status information of each subband.

In case of the localized-distributed allocation mode as illustrated in FIG. 5, when the transmitter allocates resources by determining an allocation unit of resources as $L_b$ number of subcarriers, localized allocation is performed in a unit of Lb number of subcarriers and the other resources are arranged in the position of the other subcarriers, whereby frequency gain is obtained. In this case, even though the position of resources is changed or not during retransmission, the resources are uniformly distributed in the system band. Accordingly, the receiver can notify the transmitter of symbol reliability of the received packets by transmitting channel status of each subband and also notify the transmitter of information of a channel which will transmit packets later. In FIG. 5, the receiver divides each localized resource block into two subbands, and determines channel status information of each subband.

In case of the distributed allocation mode as illustrated in FIG. 6, since subcarriers within a bandwidth which is operated are all used, same type resources are allocated during retransmission as far as the bandwidth is not changed to another RF carrier having a different bandwidth later.

Accordingly, the receiver can notify the transmitter of reliability of received packet symbols and channel status during retransmission by transmitting channel information. In FIG. 6, the receiver divides one distributed resource block into four subbands and determines channel status information of each subband.

Figure 9:
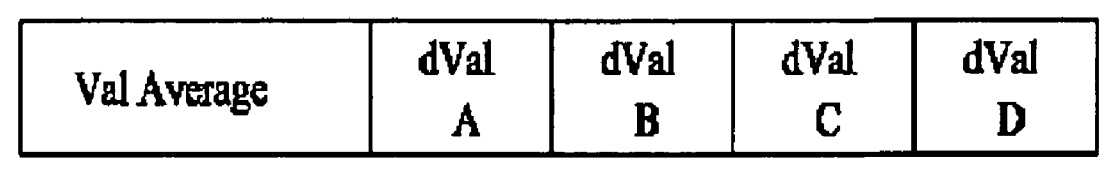

In an array type report mode of the method of transmitting channel status information to a transmitter, a channel status value corresponding to each subband divided as illustrated in FIG. 5 or FIG. 6 can be calculated, and a value of each block can be encoded directly as illustrated in FIG. 7 or in a differential mode as illustrated in FIG. 8 and FIG. 9.

In FIG. 7, examples of values of the respective blocks include Val A, Val B, Val C, and Val D.

In case of differential encoding, it can be considered that a value of a specific block can be transmitted as a reference value and the values of the other blocks can be transmitted as differential values from the reference value. In FIG. 8, Val A is a reference value, and the other values dVal B, dVal C, and dVal D are differential values from the reference value.

Alternatively, it can be considered that an average value is calculated and difference between the values of the respective blocks is defined as illustrated in FIG. 9. In FIG. 9, Val Average is an average value, and the other values dVal A, dVal B, dVal C, and dVal D are differential values from the average value.

In a notification mode of channel CQI and profile of the method of transmitting channel status information to a transmitter, maximum/minimum CQI values and ordering information of each subband can be reported in a labeling type, for example. In this case, labeling means that each of permutation patterns of blocks, which are obtained by sorting values of the respective blocks, is numbered so that the numbered value is expressed in a bit. For example, if four blocks exist, since the number of possible kinds of sorting is 4*3*2*1=24, sorting information can be transferred using five bits. In this case, only a part of permutation patters can be used instead of all permutation patterns. Namely, instead of transferring sorting information in N(=5) bits as above, sorting information can be expressed using N−1 bits or bits smaller than N−1 bits and can be mapped with a part of all permutation patterns.

In a notification mode of channel average value and profile of the method of transmitting channel status information to a transmitter, instead of maximum/minimum CQI values, an average value is reported and ordering information of each subband can be reported in a labeling type.

In a notification mode of only a channel average value of the method of transmitting channel status information to a transmitter, only an average CQI value of all resource allocation subcarriers which are used can be reported without considering profile.

Meanwhile, the case where the receiver configures channel information of all or a part of the system bandwidth beyond the resource region where packets are received corresponds to the case where the resource blocks of FIG. 5 and FIG. 6 designate a specific bandwidth of the system bandwidth or the whole system bandwidth. Channel feedback is to facilitate packet mapping by considering channel status during next retransmission.

Meanwhile, according to another embodiment of the present invention, the receiver can transfer ACK/NACK and packet reliability information to the transmitter. Reliability can be estimated through channel status before decoding of received packets or can be obtained using a soft output value after decoding. The receiver divides codewords into blocks or divides blocks into OFDM symbols to feed reliability of corresponding blocks back to the transmitter.

Figure 10:
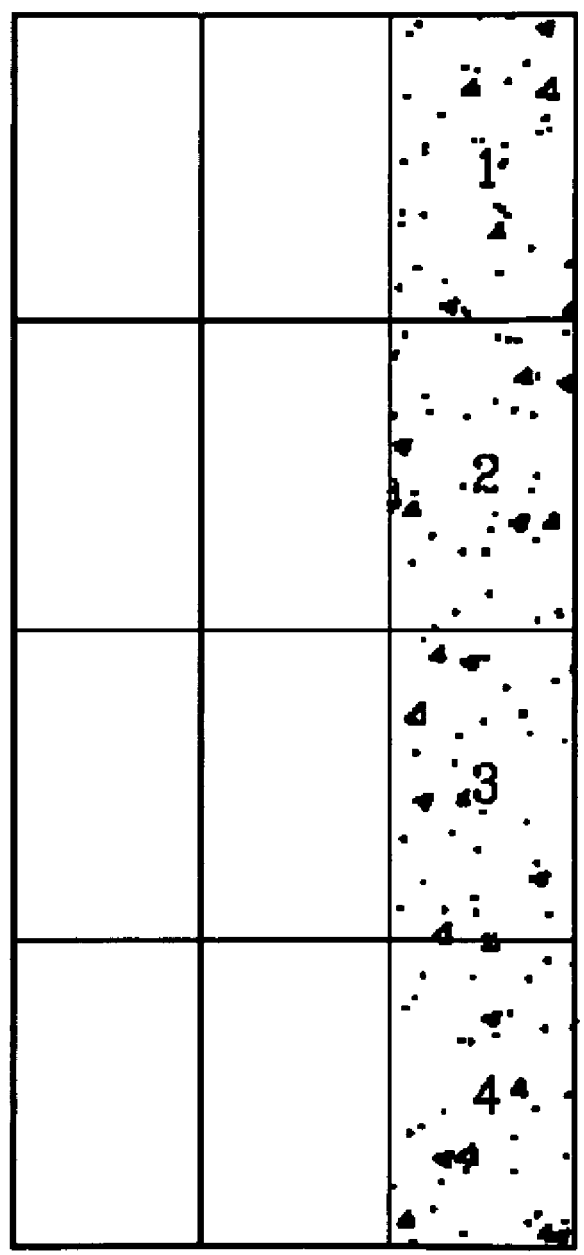
FIG. 10 is a diagram illustrating an example of a method of defining blocks for feedback information in FIG. 4 in the order of codewords.

FIG. 10 is a diagram illustrating an example of a method of defining blocks for feedback information in FIG. 4 in the order of codewords.

One block can be divided in the code bit order of actual codewords or in the combination status in the received signal. This block division can be applied in such a manner that the block is divided into values before and after codeword ordering is performed and values before and after packet decoding is performed as illustrated in FIG. 10. In FIG. 10, first to fourth blocks can correspond to the block values of FIG. 7 to FIG. 9.

Figure 11:
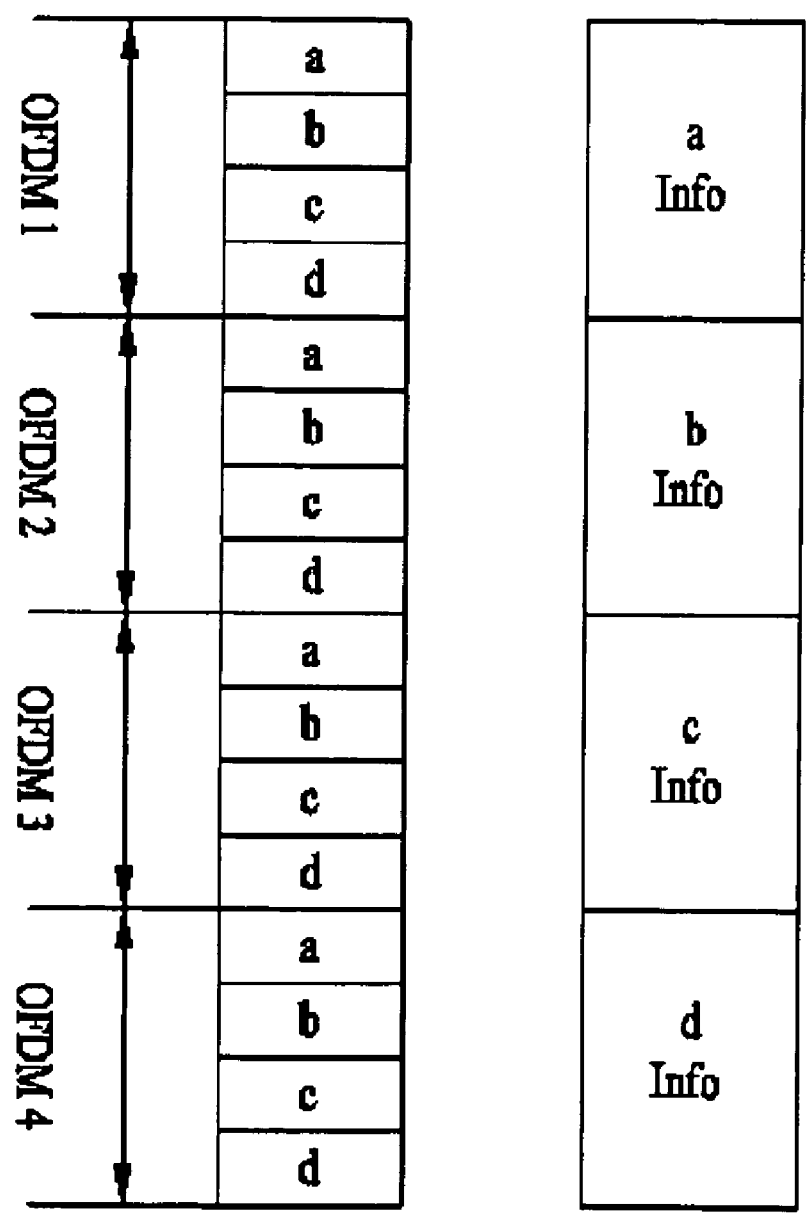
FIG. 11 is a diagram illustrating an example of a method of defining blocks for feedback information in FIG. 4 in the order of OFDM symbols.

FIG. 11 is a diagram illustrating an example of a method of defining blocks for feedback information in FIG. 4 in the order of OFDM symbols.

The receiver can feed an average value or maximum/minimum values of reliability of code bits or symbols within the corresponding block back to the transmitter in accordance with block definition in a unit of symbol. In FIG. 11, first to fourth OFDM blocks, i.e., a info, b info, c info, and d info can correspond to the block values of FIG. 7 to FIG. 9.

At this time, examples of an encoding scheme that can be established include a case where maximum/minimum reliability values and reliability ordering information between the respective blocks are fed back, a case where an average reliability value and reliability ordering information between the respective blocks are fed back, and a case where an average value of reliability is fed back. If reliability is fed back in an array type, the types of FIG. 7 to FIG. 9 can be used.

Meanwhile, if the aforementioned channel status information and reliability information of codewords are simultaneously fed back to the transmitter, feedback overhead is the greatest but the minimum retransmission probability can be obtained.

The transmitter can improve decoding probability in the receiver by using various schemes based on various kinds of feedback information.

First, if the transmitter improves mapping mode with subcarriers, the transmitter take an action so that a specific part of codewords has an excellent channel using reliability information fed back from the receiver by changing a mapping procedure of mapping generated codewords or subpackets with subcarriers. To this end, the transmitter can select a specific set from a set of subcarrier mapper and a set of interleaver in accordance with reliability information. In this case, the transmitter transfers additional information of mapper or interleaver to notify the receiver of the selected set. Preferably, the additional information is transferred to the receiver together with resource allocation information. However, if the mapper and/or the interleaver are selected according to the predetermined order, this additional information may not be transmitted.

Second, the transmitter can coordinate the power based on reliability or channel information. Namely, if a channel is degraded in a region of a specific codeword or a subcarrier part, the receiver can use a power boosting scheme to compensate channel degradation. At this time, additional information of power boosting is transferred to the receiver. If additional information of power boosting is omitted, a dedicated pilot is included in the retransmission packets. Since the dedicated pilot is boosted equally with transmission symbols, the receiver can perform channel compensation without receiving information of power boosting. The dedicated pilot can also be applied to a downlink.

Third, if the transmitter uses incremental redundancy, the transmitter can generate redundancy packets in accordance with feedback information. Additional information of redundancy packets is transferred to the receiver together with resource allocation information. When the transmitter generates redundancy packets, a method of enhancing a redundancy rate of a specific block part of codewords can be used. Also, a set of several possible methods for generating redundancy packets can be defined, and the transmitter can generate redundancy packets by selecting the most suitable method.

If MIMO antenna is used, the transmitter can select MIMO mode for improving reliability in accordance with feedback information. Namely, when corresponding packets are retransmitted, a specific MIMO mode can be used. Information of the specific MIMO mode can be transferred to the receiver together with resource allocation information. For example, a spatial multiplexing is used for the first transmission. And then spatial multiplexing/transmit diversity/precoding/beamforming may be used for the retransmission. That is, if we use various MIMO modes including other MIMO modes other than that used at the initial transmission while performing retransmission, the reliability of the retransmission may be enhanced.

Information for the used MIMO mode may not be transmitted when it is predetermined as a HARQ configuration. However, if the used MIMO mode is determined according to the reported information from the receiving side, information for the used MIMO mode shall be transmitted to the receiving side.

Even though the same mode is used, the receiver can change the symbol mapping order in MIMO input to emphasize uniformity of reliability.

The aforementioned methods can be used in combination. Also, if the receiver fails decoding during packet transmission, the receiver can recommend option that can be selected from the transmitter. The transmitter can retransmit packets based on the selected option. In this case, information of the selected option can be transferred to the receiver together with resource allocation information. At this time, it becomes robust to the feedback channel but overhead increases. On the other hand, if the transmitter does transmit information of the selected option to the receiver, reliability of the feedback channel should be enhanced to lower error probability, whereby protocol can be prevented from being disordered.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention relates to a method for packet retransmission employing feedback information, in which a transmitter changes a retransmission mode and retransmits packets in accordance with information fed back from a receiver to enhance decoding probability of received packets. The present invention can be applied to a base station and a mobile station, which use a packet retransmission method in a system such as 3GPP LTE system and IEEE 802.16m system.

What is claimed is:

1. A method for packet retransmission utilizing feedback information, in which packets are retransmitted in accordance with feedback information of a receiver, the method comprising:
   receiving reception acknowledgement information after packets are transmitted, the reception acknowledgement information representing channel status information and information representing decoding success or failure;

changing a retransmission mode according to the channel status information when the reception acknowledgement information represents decoding failure and transmitting retransmission packets of the packets according to the changed retransmission mode, wherein the channel status information includes channel quality indicator (CQI) values of subbands divided into units of a subcarrier.

2. The method of claim 1, wherein the channel status information includes maximum CQI value and minimum CQI value of subbands divided into units of subcarrier and reliability order of the subbands.

3. The method of claim 1, wherein the channel status information includes CQI average value of subbands divided into units of subcarrier and reliability order of the subbands.

4. The method of claim 1, wherein the channel status information includes CQI average value of a channel that is measured by the receiver.

5. The method of claim 1, wherein the channel status information includes information of a band, other than a resource region where the receiver receives the packets.

6. The method of claim 1, wherein transmitting retransmission packets includes:

changing a subcarrier mapping mode according to the channel status information; and transmitting retransmission packets by utilizing the changed subcarrier mapping mode.

7. The method of claim 1, wherein transmitting retransmission packets includes:

compensating a degraded channel by utilizing a power boosting scheme in accordance with the channel status information; and transmitting retransmission packets by utilizing the compensated channel.

8. The method of claim 1, wherein transmitting retransmission packets includes:

coordinating a redundancy rate of specific parts of incremental redundancy packets for retransmission according to the channel status information; and retransmitting the incremental redundancy packets.

9. The method of claim 1, wherein transmitting retransmission packets includes:

changing a multiple-input multiple-output (MIMO) operation mode in accordance with the channel status information; and transmitting retransmission packets of the packets by applying the changed MIMO operation mode.

10. A method for packet retransmission utilizing feedback information, in which packets are retransmitted in accordance with feedback information of a receiver, the method comprising:

receiving reception acknowledgement information after packets are transmitted, the reception acknowledgement information representing reliability information of the packets and information representing decoding success or failure;

changing a retransmission mode according to with the reliability information when the reception acknowledgement information represents decoding failure and transmitting retransmission packets of the packets according to the changed retransmission mode, wherein the reliability information includes reliability of blocks defined by one or more orthogonal frequency-division multiplexing (OFDM) symbol sections of a codeword bit unit or a subcarrier symbol units of the packets.

11. The method of claim 10, wherein the reliability information includes maximum and minimum reliability values of blocks and reliability order of the blocks.

12. The method of claim 10, wherein the reliability information includes an average reliability value of blocks and reliability order of the blocks.

13. The method of claim 10, wherein the reliability information includes an average reliability value of all symbols received in the receiver.

14. The method of claim 10, wherein transmitting retransmission packets includes:

changing a subcarrier mapping mode according to the reliability information; and transmitting retransmission packets by utilizing the changed subcarrier mapping mode.

15. The method of claim 10, wherein transmitting retransmission packets includes:

compensating a degraded channel by utilizing a power boosting scheme in accordance with the reliability information; and transmitting retransmission packets by utilizing the compensated channel.

16. The method of claim 10, wherein transmitting retransmission packets includes:

coordinating a redundancy rate of specific parts of incremental redundancy packets for retransmission according to the reliability information; and retransmitting the incremental redundancy packets.

17. The method of claim 10, wherein transmitting retransmission packets includes:

changing a multiple-input multiple-output (MIMO) operation mode according to the reliability information; and transmitting retransmission packets by applying the changed MIMO operation mode.

* * * * *